No. 863,267. PATENTED AUG. 13, 1907.
N. H. DAVIS.
ADJUSTABLE BRAKE HEAD.
APPLICATION FILED FEB. 18, 1907.
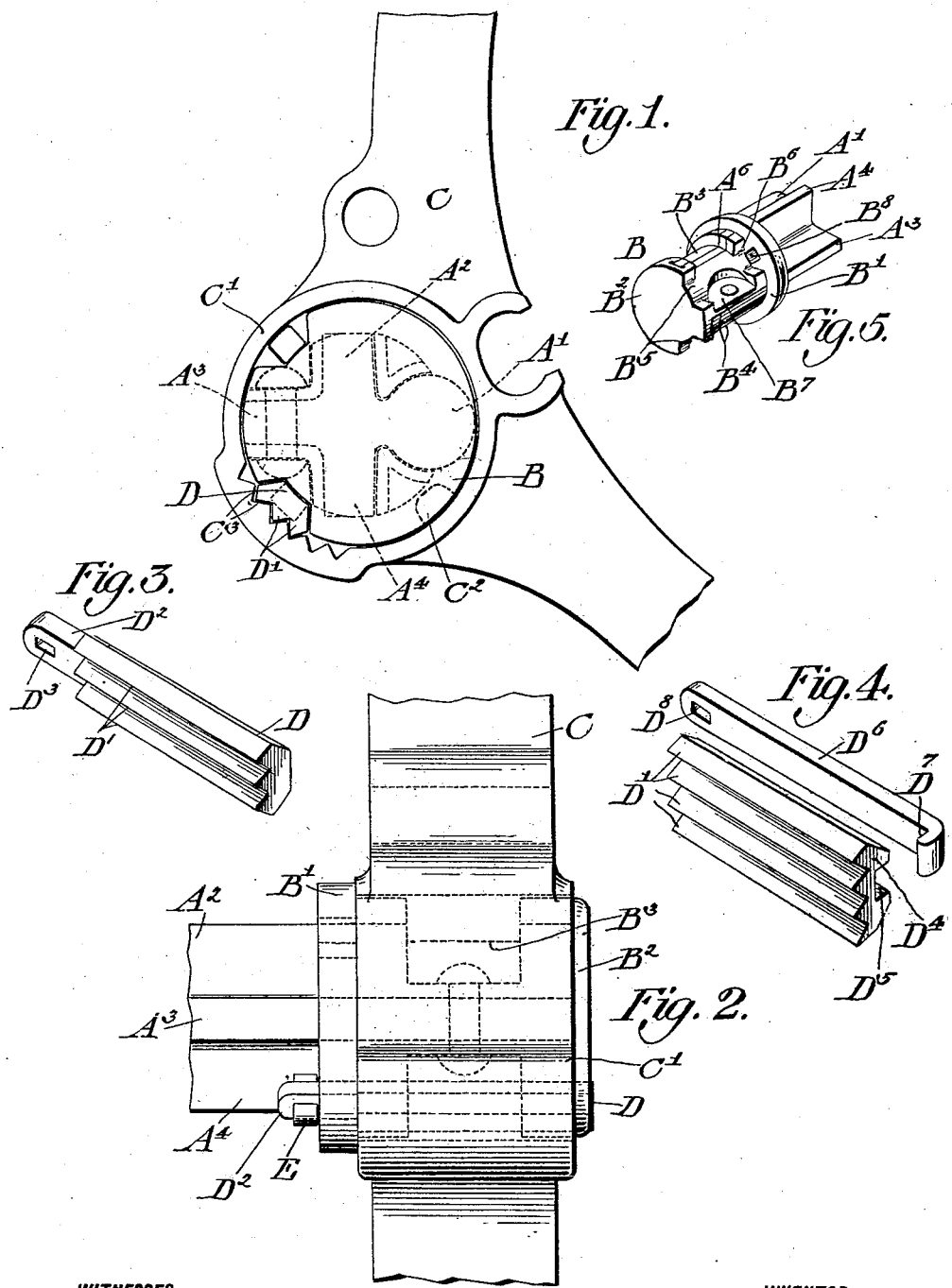

UNITED STATES PATENT OFFICE.

NATHAN H. DAVIS, OF PHILADELPHIA, PENNSYLVANIA.

ADJUSTABLE BRAKE-HEAD.

No. 863,267.  Specification of Letters Patent.  Patented Aug. 13, 1907.

Application filed February 18, 1907. Serial No. 357,868.

*To all whom it may concern:*

Be it known that I, NATHAN H. DAVIS, a citizen of the United States of America, residing in Philadelphia, county of Philadelphia, and State of Pennsylvania, have invented a certain new and useful Improvement in Adjustable Brake-Heads, of which the following is a true and exact description, reference being had to the accompanying drawings, which form a part thereof.

My present invention relates to brakebeams and has for its object the provision of simple and reliable means for detachably securing brakeheads in place on the ends of brakebeams and with any desired angular adjustment of the heads relative to the beams.

My invention is particularly designed for use with beams made from rolled blanks and having end members secured to them on which the brakeheads are secured, though in many of its aspects my invention is independent of the character of the beam to which the brakeheads are secured. The various features of novelty which characterize my invention are pointed out with particularity in the claims annexed to and forming a part of this specification.

For a better understanding of my invention, however, reference may be had to the accompanying drawings and descriptive matter in which I have described forms in which my invention may be carried out.

Of the drawings Figure 1 is an end elevation showing a portion of a brakehead in place on its beam. Fig. 2 is an elevation taken at right angles to Fig. 1. Fig. 3 is a perspective view of a one part locking device employed. Fig. 4 is a perspective view of a two part locking key which may be employed in place of the one shown in Fig. 3 and Fig. 5 is a perspective view of a brakebeam end with the brakebeam end member in place.

In the drawings A represents the brakebeam which in the form shown is of the character described in my Patent No. 683,720, granted October 1, 1901, in which the beam is formed of a rolled bar cruciform in cross section, having one flange or rib $A^1$ substantially circular in cross section and other flat, bar like flanges $A^2$, $A^3$, and $A^4$.

In the form of my invention disclosed an end member B, of the form disclosed in my prior application Serial No. 329,493, filed August 6, 1906, is secured on each beam end. This end member has formed in it a socket similar in cross section to the cross section of the end of the beam which it receives. The end member has a collar portion $B^1$ at its inner end and is closed at its outer end by a web $B^2$. From the collar $B^1$ to the opposite end the member may be regareded as a cylindrical body which has formed in its periphery a slot or groove comprising a circumferential portion $B^3$ which terminates adjacent axial ribs, $B^4$, two axial portions $B^5$ located one at each side of the ribs $B^4$ and passing to the outer end of the member and two axial portions $B^6$ in line each with one of the axial portions $B^5$ and extending to the collar $B^1$. The flanges $A^1$, $A^2$ and $A^4$ are notched at $A^6$ so that the walls of the notches are in line with the walls of the circumferential slot portion $B^3$. Each end member may be secured to the beam by a rivet passing through the flange $A^3$ and adjacent parts of the end member which are cut away at $B^7$ to facilitate the riveting operation.

The brakehead C fitting on the end member of the beam is provided with a cylindrical portion or shell $C^1$ surrounding the member B. From the inner surface of the shell $C^1$ projects a lug $C^2$. In assembling the head on the beam, the head is first moved axially to carry the lug $C^2$ into the slot portion $B^3$ through one or the other of the slot portions $B^5$ and the head is then given a partial turn. This arrangement forms virtually a bayonet joint connection between the brakebeam and the brakehead by which the brakehead may be readily and detachably assembled in place. The slot and lug are so relatively arranged that when the brakehead is in the operative position, shown in Fig. 1 to properly engage the wheel braked, the lug $C^2$ and coöperating walls of the slot portion $B^3$ prevent axial displacement of the brakehead, though the inner thrust of the brakehead may be borne by the flange $B^1$.

The inner surface of the portion of the shell $C^1$ adjacent one or the other of the slots $B^5$ when the head is in the proper relation to the brakebeam is provided with a series of gear teeth or ribs $C^3$ extending parallel to the axis of the beam end, and the head is locked in the desired angular relation to the brakebeam by a locking key or device inserted axially in the proper set of slots, $B^5$ and $B^6$. The locking key D shown in Figs. 1, 2 and 3 has longitudinal ribs or teeth $D^1$ formed on its outer side which mesh with the teeth or ribs $C^3$, and is secured in place by a locking bar $D^2$ which passes through an aperture $B^8$ in the collar $B^1$ and is integrally connected to the locking key. A cotter pin E or the like passing through an opening $D^3$ formed in the portion of the locking bar which passes through the collar $B^1$ detachably secures the locking key in place.

The locking key $D^4$ shown in Fig. 4 differs from the key D in that it may be inserted in the slots $B^5$ and $B^6$ with either end foremost as desired in order to vary the angular adjustment of the brakehead on the beam. On this account its ribs or teeth $D^1$ are not symmetrically disposed with respect to the plane passing through the axis of the beam end and the center of the key $D^4$, but are arranged so that an angular adjustment of the teeth $D^1$ and consequently of the teeth $C^3$ on the brakehead, one-half as great as the angular distance between each pair of adjacent ribs or teeth $D^1$ may be obtained by turning the locking key $D^4$ end for end in the slots $B^5$ and $D^6$. The locking key $D^4$ has formed in its inner surface a channel $D^5$ which receives a locking bar $D^6$ having its outer end upturned at $D^7$ to engage the outer end of the locking key and its inner end passing through the collar $B^1$, and formed with an aperture $D^8$ to receive the cotter pin E.

In assembling the brakehead in place the brakehead is turned so that the lug $C^2$ may enter the proper slot $B^5$ and the brakehead is then moved axially into place after which it is turned to the proper angular position so that the brake-shoe (not shown) carried by the head may engage the wheel to be braked in the proper manner. The locking key is then put into place. Preferably the parts are fitted so that the locking key makes a driving fit with the end member and the brakehead, the cotter pin forming merely a precautionary device. By suitably proportioning the angular distance between the ribs or teeth on the locking key and the ribs or teeth $C^3$ any desired degree of niceness of adjustment of the brakeheads may be obtained while at the same time the brakeheads are rigidly but detachably secured in place.

Having now described my invention what I claim as new and desire to secure by Letters Patent is,

1. In combination a brakebeam, a brakehead having an opening receiving the end of the beam and provided with locking ribs, a locking key provided with ribs and means for securing said key in fixed relation to the beam with its ribs interlocked with the ribs of the brakehead.

2. A brakebeam having an end portion of irregular cross section, an end member having a socket receiving said end, a brakehead member mounted on said end member, said end member having a slot formed in its surface, a portion of which extends in an axial direction and other portions of which extend transversely thereto, and the brakehead member being provided with a lug, the lug and slots being so arranged that the lug will be in alinement with the axial portion of the slot when the brakehead is angularly rotated from its normal position, but when in its normal position said lug coöperates with the walls of said slot to prevent axial displacement of the brakehead, and removable means for securing said brakehead on said brakebeam in a definite angular relation.

3. In combination a brakebeam, a cylindrical end member on each end of the beam, a brakehead having an opening receiving said end member and provided with locking ribs, a locking key provided with a relatively small number of ribs and means for securing said key in fixed relation to the beam with its ribs interlocked with such of the ribs of the brakehead as to give the desired angular position of the brakehead.

4. A brakebeam having an end portion of irregular cross section, an end member having a socket receiving said end and a brakehead member mounted on said end member, said end member having a slot formed in its surface, a portion of which extends in an axial direction and other portions of which extend transversely thereto, and the brakehead member being provided with a lug, the lug and slots being so arranged that the lug will be in alinement with the axial portion of the slot when the brakehead is angularly rotated from its normal position but when in its normal position said lug coöperates with the walls of said slot to prevent axial displacement of the brakehead, and means for securing said brakehead in a definite angular position on said brakebeam, said means including a key inserted in said axial portion of said slot.

5. A brakebeam having an end portion of irregular cross section, an end member having a socket receiving said end and a brakehead member mounted on said end member, said end member having a slot formed in its surface, a portion of which extends in an axial direction and other portions of which extend transversely thereto and the brakehead member being provided with a lug, the lug and slots being so arranged that the lug will be in alinement with the axial portion of the slot when the brakehead is angularly rotated from its normal position but when in its normal position, said lug coöperates with walls of said slot to prevent axial displacement of the brakehead and adjustable means for securing said brakehead in any desired angular position on said brakebeam, said means including a key inserted in said axial portion of said slot, said key having axially extending ribs or teeth and said brakebeam having ribs or teeth interlocked with the ribs or teeth on the key when the latter is inserted in said slot.

6. A brakebeam, a brakehead having a hollow shell receiving the end of the beam, said shell having teeth or ribs formed on its inner surface, a locking key provided with teeth or ribs and means for securing said key in fixed relation to the beam in either of two relations, in each of which the teeth on the locking key mesh with those on the shell, the teeth on said key in one relation being angularly displaced from the position occupied by them when the key is in the other relation by an amount which is not an even multiple of the angular distance between an adjacent pair of teeth.

7. A brakebeam having a brake supporting end portion, a brakehead having a shell portion surrounding said end portion, one of said portions having a slot for a locking key and the other of said portions being provided with gear teeth and a locking key removably received in said slot and provided with gear teeth meshing with said teeth on said portion when the key is in place.

8. A brakebeam having a brake supporting end portion, a brakehead having a shell portion surrounding said end portion, one of said portions having a slot for a locking key and the other of said portions being provided with gear teeth and a locking key removably received in said slot and provided with gear teeth meshing with said teeth on said portion when the key is in place, said locking key being end for end reversible in said slot and the teeth on said key being disposed so that when the key is reversed the teeth are laterally displaced a distance which is not an even multiple of the distance between adjacent teeth.

NATHAN H. DAVIS.

Witnesses:
ARNOLD KATZ,
ERNEST H. HOBBS.